Jan. 4, 1949.  E. C. WALKER  2,457,958
FILTER
Filed Feb. 7, 1945
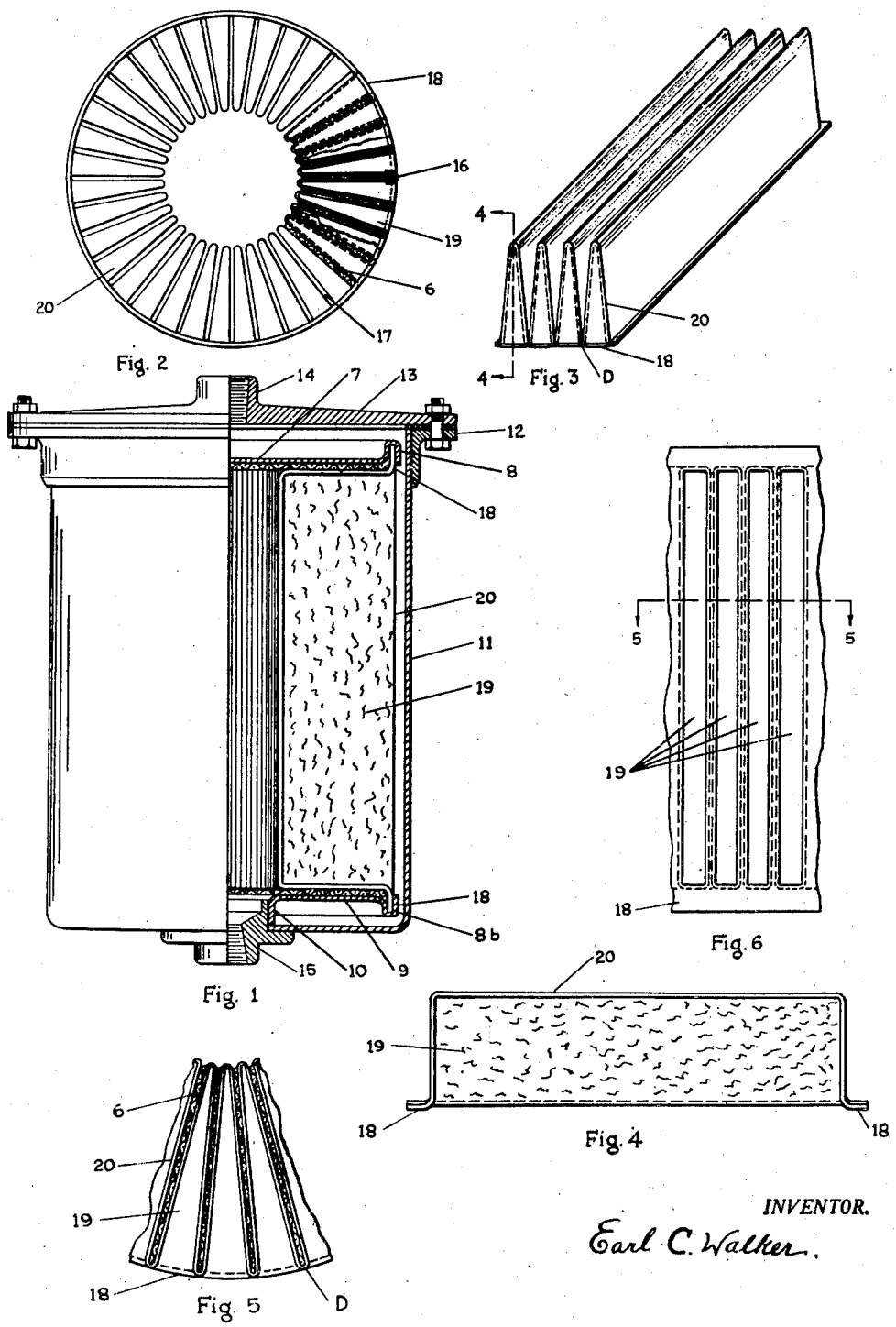
INVENTOR.
Earl C. Walker.

Patented Jan. 4, 1949

2,457,958

UNITED STATES PATENT OFFICE 2,457,958

FILTER

Earl C. Walker, Altadena, Calif.

Application February 7, 1945, Serial No. 576,522

6 Claims. (Cl. 210—169)

This invention relates to filters and particularly to oil filters for use in connection with internal combustion engines.

The object of the present invention is to provide a filter of molded material such, for example, as fiber used in filter paper construction of a design satisfactory for use in a filter of the automotive type.

Another object is to provide a filter element with a minimum of seams or joints to be sealed and so designed that such joints as are required can be readily and securely sealed against the possibility of leakage.

Another object is to provide a filter element that lends itself to ease of molding and low cost production.

Another object is to provide a filter having an extensive area in a relatively small casing whereby the rate of filtration and the life of the filter element is sufficient to meet requirements.

Figure 1 is a view in elevation of a filter partially sectioned, employing a filtration unit embodying the invention.

Figure 2 is a plan view of a filter element in partial section.

Figure 3 is a perspective view of a portion of a filter element as it is molded and before it is formed into a cylindrical unit as shown in Figure 2.

Figure 4 is a longitudinal section taken on the line 4—4 of Figure 3.

Figure 5 is a partial cross section on the line 5—5 of Figure 6 showing how the molded element is bent and also showing inserts between the contiguous walls.

Figure 6 is an elevation of Figure 3 as viewed from the bottom side.

Referring to the drawings, Figure 1 shows in elevation a filter partially sectioned in which a casing 11 has an outlet connection 15 in its base and an outwardly extending flange 12 around its open end with which is matched a cover-plate 13 which is bolted or otherwise secured thereto and is provided with an inlet connection 14. Within the casing 11 is mounted the filter unit 20 embodying this invention.

The filter unit 20 is formed or molded of fibrous paper filtration material in the form of a hollow-toothed rack as partially shown in perspective in Figure 3. The hollow teeth have their ends closed by gable-like walls, while their flank walls unite in the valleys between the teeth to form a continuous wall as shown more clearly at D in Figure 5. The teeth are of sectorial form and their flank walls and gable-like end walls embrace triangular pockets which are open at their bases as shown by 19 in Figure 6 which is a view of the bottom of the rack shown in Figure 3. A continuous flange 18 extends outwardly along each end of the rack of teeth at the bases of their gabled end walls as shown in the various figures. These flanges 18 comprise a series of arcs, each of which spans the base of a sectorial tooth of the rack and their curvature corresponds to that of the circle of which the teeth are truncated sectors.

The molding of this filter unit is facilitated by the fact that it is initially in the form of a straight hollow toothed rack. After molding, it is bent at the points D shown in Figures 3 and 5 so that the flank walls of the teeth are brought together, thus forming a cylindrical drum with an axial open passage through its center due to the fact that the apexes of the sectorial teeth are truncated. When so bent at the junction points D of the series of arcs which constitute the flanges 18, these arcs blend into a circular band or chime around the ends of the drum-like filter unit as shown at 18 in Figures 1 and 2; and on bringing the extreme end flank walls together an open longitudinal slit occurs where the base edges of these flank walls meet, so that it must be closed and sealed in some manner, such as by a strip of U section metal crimped over said edges as shown at 16, Figure 2.

At the base of the hollow teeth of the molded structure where the flank walls of the teeth unite, sufficient stock is left to form an arc as shown at D—Figure 5, so that on bending as already described small radial spaces are left between the contiguous flank walls in the circular drum-like filter unit as shown by 17 in Figure 2. Strips of wire screen 6 shown in Figures 2 and 5 are inserted in these radial spaces to afford interstitial passages for the filtrate, and also circular discs of wire screen are placed on each end of the drum-like filter unit after which the header plates 7 and 9 in Figure 1 are attached by crimping their reversed flanged edges 8 and 8b over the rims or chimes 18 of the filtration unit. The discs of wire screen afford passages for the flow of the filtrate between the header plates and the gable end walls of the hollow filter sectorial cells. The top headed plate 7 in Figure 1 closes completely the upper end of the filter unit, but the lower header plate 9 has an aperture in its center with a flange 10 around its margin and extending axially downward for engagement with an extension of the outlet connection 15 that protrudes into the casing 11.

In operation a filterable fluid is introduced through the connection 14 of the cover plate and flows over the top header plate 7 to the annular space between the filter unit and the walls of the casing 11 and then fills the triangular pockets 19 which open outwardly into the said annular space. It then is filtered through the porous walls of the filtration structure to the radial interstitial passages between the flank walls of the sectorial cells or pockets. Through these interstitial passages it flows inwardly to the central axial passageway of the filter unit and from there escapes through the conduit opening in the outlet connection 15. Such filtrate as exudes through the end gable-like walls of the sectorial pockets flows through the passages afforded by the screen disc insertions between the ends of the filtration element and its end header-plates to the aforementioned central axial passageway and escapes therefrom through the outlet 15 as does the rest of the filtrate as already explained. The extraneous matter entrained in the fluid being filtered is arrested and segregated in the sectorial pockets 19, so that when the filter unit has reached the end of its effective life or when the number of hours of filtration has been reached after which the filter unit is to be replaced or renewed, the cover plate 13 may be removed and the entire filter unit lifted out of the casing 11 and discarded; and a new filtration unit may readily be installed for continued operation.

Instead of wire screen, I may employ any other material of such form or consistency as will afford a passage means for the filtrate. I may also employ cloth or felt or other filtration material in lieu of wire screen whereby a secondary stage of filtration could be attained. In the filter structure embodying the present invention, I may employ the means of affording interstitial passageways between the contiguous surfaces of the flank walls of the sectorial cells by the use of irregular or roughened surfaces thereof as disclosed in Patent No. 2,352,300 issued June 27, 1944 to E. C. Walker et al.

It is obvious that the subject invention lends itself particularly to the process of molding such a unit from fibrous paper material and that it facilitates mass production control and inspection at low cost, and also affords a very extensive filtration area in small volumetric space. Another salient feature of this invention is the fact that the flank walls of the structure are contiguously opposed to one another so that they are self-sustaining against collapse or rupture from such differential pressure as may exist between the exterior and the interior thereof.

Still another important feature is the fact that this filter unit has a minimum number of seams or joints to be sealed, and such as are required are accessible so that they may be securely sealed as well as inspected.

While the embodiment herein shown clearly illustrates the invention, it should be understood that the invention extends to other forms, arrangements, structures and details falling within the scope and spirit thereof and not sacrificing all of its material advantages.

What is claimed is:

1. A filter unit comprising: a plurality of sectoral elements each having integrally joined permeable side and end walls but open at its base, said sectoral elements joined edge to edge along the side margins of their bases and rolled into a hollow cylinder whereby the side walls of adjacent sectoral elements are in contiguous mutually supporting relation and the open bases of said sectoral elements are directed radially outward; and sealing means closing the axial ends of said cylinder.

2. A filter unit comprising: a series of sectoral elements having integrally joined permeable side and end walls but open at their bases, said side walls being integrally united edge to edge at the bases of said sectoral elements and folded at their lines of union to bring the side walls of adjacent elements into contiguous mutually supporting relation with each other whereby compositely a cylindrical structure is formed with the extreme side walls of said series of said sectoral elements in abutting relation; sealing means uniting said extreme abutting side walls; and other sealing means closing the axial ends of said cylindrical structure.

3. A filter unit comprising: a plurality of hollow integrally joined permeable rack-tooth-like elements closed at their ends and sides and open at their bases, said sides converging and joined edge to edge to form a rack-like structure, said structure adapted to be rolled to form a hollow cylinder with said elements directed radially inward and their confronting sides in substantially parallel mutually supporting relation and their bases directed radially outward; the axial ends of said elements having arced axially directed flanges across their base edges adapted to define compositely an annular rim at each end of said cylinder; and cover plates joined to said rims and sealing the ends of said cylinder.

4. A filter unit comprising: a series of hollow integrally joined permeable rack-tooth-like sectors closed at their ends and sides but open at their bases, said sides converging and united at the base edges of said sectors to form initially a rack-like structure adapted to be rolled to form a hollow cylinder with the extremities of said rack-like structure brought into abutment, with the apexes of said sectors directed radially inward, with the adjacent side walls of said sector in substantial parallelism and with their bases directed radially outward; the ends of said sectors having axially directed flanges across their base edges adapted to form compositely an annular rim around the outer periphery of each end of said cylinder; cover plates joined to said rims and closing the ends of said cylinder; and other sealing means closing said abutting extremities of said rack-like structure.

5. A filter unit as set forth in claim 1 wherein: foraminous spacer members extend between said contiguous walls, and other foraminous spacer members are disposed between said sealing means and the ends of said cylinder.

6. A filter unit as set forth in claim 1, wherein: spacer elements of filtration material different in character from said permeable walls are disposed between the sides of said walls in contiguous relation.

EARL C. WALKER.

REFERENCES CITED

The following references are of record in the file of this patent:

UNITED STATES PATENTS

| Number | Name | Date |
|---|---|---|
| 2,218,800 | Williams | Oct. 22, 1940 |
| 2,279,423 | Vokes | Apr. 14, 1942 |
| 2,352,300 | Walker et al. | June 27, 1944 |
| 2,358,238 | Linblad | Sept. 12, 1944 |
| 2,362,530 | Bennett | Nov. 14, 1944 |
| 2,395,449 | Briggs | Feb. 26, 1946 |

FOREIGN PATENTS

| Number | Country | Date |
|---|---|---|
| 46,881 | France | Aug. 4, 1936 |
| 401,287 | Great Britain | Oct. 30, 1933 |
| 425,409 | Great Britain | Mar. 7, 1935 |
| 497,020 | Great Britain | Dec. 12, 1938 |
| 639,445 | France | Mar. 10, 1928 |